United States Patent
Hojjati

(10) Patent No.: US 12,452,037 B2
(45) Date of Patent: Oct. 21, 2025

(54) GENERATING PRIVATE KEYS FOR QUANTUM-SAFE ALGORITHMS ON CONSTRAINED DEVICES

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 97 days.

(21) Appl. No.: 18/406,314

(22) Filed: Jan. 8, 2024

(65) Prior Publication Data
US 2025/0226973 A1    Jul. 10, 2025

(51) Int. Cl.
*H04L 9/40* (2022.01)
*H04L 9/08* (2006.01)

(52) U.S. Cl.
CPC .......... *H04L 9/0825* (2013.01); *H04L 9/0852* (2013.01)

(58) Field of Classification Search
CPC .............. H04L 9/0825; H04L 9/0852
See application file for complete search history.

(56) References Cited

U.S. PATENT DOCUMENTS

| | | | |
|---|---|---|---|
| 2017/0257352 A1* | 9/2017 | Revell | H04L 9/0822 |
| 2020/0259650 A1* | 8/2020 | Montemurro | H04L 9/321 |
| 2023/0300129 A1 | 9/2023 | Hojjati et al. | |
| 2023/0344639 A1 | 10/2023 | Hojjati | |
| 2023/0344650 A1 | 10/2023 | Hojjati | |
| 2023/0385811 A1 | 11/2023 | Naidoo et al. | |
| 2024/0414687 A1* | 12/2024 | Aravapalli | G01S 5/0009 |
| 2025/0062923 A1* | 2/2025 | Sani | G06F 21/64 |

* cited by examiner

*Primary Examiner* — Thaddeus J Plecha
(74) *Attorney, Agent, or Firm* — Baratta Law PLLC; Lawrence A. Baratta, Jr.

(57) ABSTRACT

A constrained device includes a processor; and memory storing program code that is configured to cause the processor to, responsive to a requirement for a private key for a function, perform operations on a plurality of seeds to obtain the private key; store the private key in the memory; and utilize the private key for the function. The program code is further configured to cause the processor to, subsequent to the function, remove the private key from the memory. The private key is for a quantum-safe algorithm. Advantageously, the present disclosure supports longer private keys for the quantum-safe algorithm, relative to existing algorithms, with limited resources in the constrained device.

18 Claims, 2 Drawing Sheets

GENERATING PRIVATE KEYS FOR QUANTUM-SAFE ALGORITHMS ON CONSTRAINED DEVICES

FIELD OF THE DISCLOSURE

The present disclosure relates generally to computing. More particularly, the present disclosure relates to systems and methods for generating private keys for quantum-safe algorithms on constrained devices, e.g., embedded devices or the like.

BACKGROUND OF THE DISCLOSURE

Device connectivity is proliferating. This includes various computing devices including laptops, servers, desktop computers, mobile phones, tablets, and the like, i.e., general-purpose computing devices. There is also another category of devices which can be referred to as embedded devices which can include Internet-of-Things (IoT) devices, etc. Compared to a general-purpose computing device, an embedded device similarly includes one or more processors, memory, and a network interface, but it is generally more focused or dedicated to performing one or more functions. Accordingly, embedded devices typically have constraints relative to general-purpose computing devices, such as in terms of size, power, memory, battery, etc. For example, a simple example of a constrained device is a tracker tag, its single purpose is to provide a location, and the constraints include minimizing processing power and memory usage to maximize battery life. Conversely, a mobile phone or laptop can perform a multitude of tasks and are designed to be charged frequently as the processing power and memory is higher to support the different tasks.

These constrained devices use private keys for various functions related to authentication, encrypted communication, enrollment, provisioning, upgrades, and the like.

These constrained devices are designed to operate with existing asymmetric algorithms such as RSA 2048, RSA 3072, ECC 256, ECC 521, etc. and symmetric algorithms such as AES 128, AES 256, etc. With the emergence of quantum computing, these algorithms will no longer be effective. As such, there is movement to so-called quantum-safe algorithms. Of note, the key sizes are orders of magnitude larger in quantum-safe algorithms, leading to problems with these constrained devices.

BRIEF SUMMARY OF THE DISCLOSURE

The present disclosure relates to systems and methods for generating private keys for quantum-safe algorithms on constrained devices, e.g., embedded devices or the like. Of note, private key sizes in quantum-safe algorithms tend to be significantly larger than private key sizes in existing asymmetric or symmetric algorithms. With limited memory and other resources in constrained devices, the present disclosure includes storing seeds for a private key from a quantum-safe algorithm and associated logic to generate the private key when needed. This is performed instead of storing the private key itself. Accordingly, the private key is generated on demand when needed which reduces resource usage. Further, this approach provides additional security as the private key itself is not stored on the constrained device, but rather the seeds.

In an embodiment, a constrained device includes a processor; and memory storing program code that is configured to cause the processor to, responsive to a requirement for a private key for a function, perform operations on a plurality of seeds to obtain the private key; store the private key in the memory; and utilize the private key for the function. The program code can be further configured to cause the processor to, subsequent to the function, remove the private key from the memory. The private key can be for a quantum-safe algorithm. The quantum-safe algorithm can be one of lattice-based, hash-based, code-based, multivariate-based, and isogeny-based. The program code can be further configured to cause the processor to, prior to the requirement for the private key, store the plurality of seeds in the memory. The memory can further store the plurality of seeds and logic that defines the operations on the plurality of seeds to obtain the private key.

The program code can be further configured to, for upgrading the constrained device from using non-quantum safe algorithm to a quantum safe algorithm, cause the processor to delete an existing private key stored in the memory, wherein the existing private key is for a non-quantum safe algorithm; and receive and store the plurality of seeds and associated program code for the operations on the plurality of seeds to obtain the private key. The function can relate to one of authentication, encrypted communication, enrollment, provisioning, and upgrades. The constrained device can be an Internet-of-Things (IoT) device. The constrained device can be a battery-powered tracker tag.

In another embodiment, a method implemented by a constrained device includes, responsive to a requirement for a private key for a function associated with the constrained device, performing operations on a plurality of seeds to obtain the private key; storing the private key in memory of the constrained device; and utilizing the private key for the function. The method can further include, subsequent to the function, removing the private key from the memory. The private key can be for a quantum-safe algorithm. The quantum-safe algorithm can be one of lattice-based, hash-based, code-based, multivariate-based, and isogeny-based. The method can further include, prior to the requirement for the private key, storing the plurality of seeds in the memory. The memory can store the plurality of seeds and logic that defines the operations on the plurality of seeds to obtain the private key.

The constrained device can utilize a non-quantum safe algorithm with an existing private key stored in memory, and, for upgrading the constrained device from using the non-quantum safe algorithm to a quantum safe algorithm, the method can include deleting the existing private key stored in the memory; and receiving and storing the plurality of seeds and associated program code for the operations on the plurality of seeds to obtain the private key. The function can relate to one of authentication, encrypted communication, enrollment, provisioning, and upgrades. The constrained device can be an Internet-of-Things (IoT) device. The constrained device can be a battery-powered tracker tag.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for generating private keys for quantum-safe algorithms on constrained devices, e.g., embedded devices or the like. In particular, the present disclosure includes techniques to efficiently store larger private keys in constrained devices, i.e., larger private keys for quantum-safe algorithms versus smaller private keys for existing algorithms. Instead of storing the larger private keys, the constrained device stores seeds and uses logic to generate the private key on demand, as needed. Advantageously, this approach supports more advanced quantum-safe algorithms while preserving the limitations of constrained resources. Further, this approach enable upgrades in existing constrained devices which are configured to support smaller keys (e.g., <1 kb in size), by only storing the seeds. Even further, this approach is more secure as the device itself does not store any key, but rather the constituent parts (seeds) of the private key.

Example Constrained Device Architecture

Figure 1:
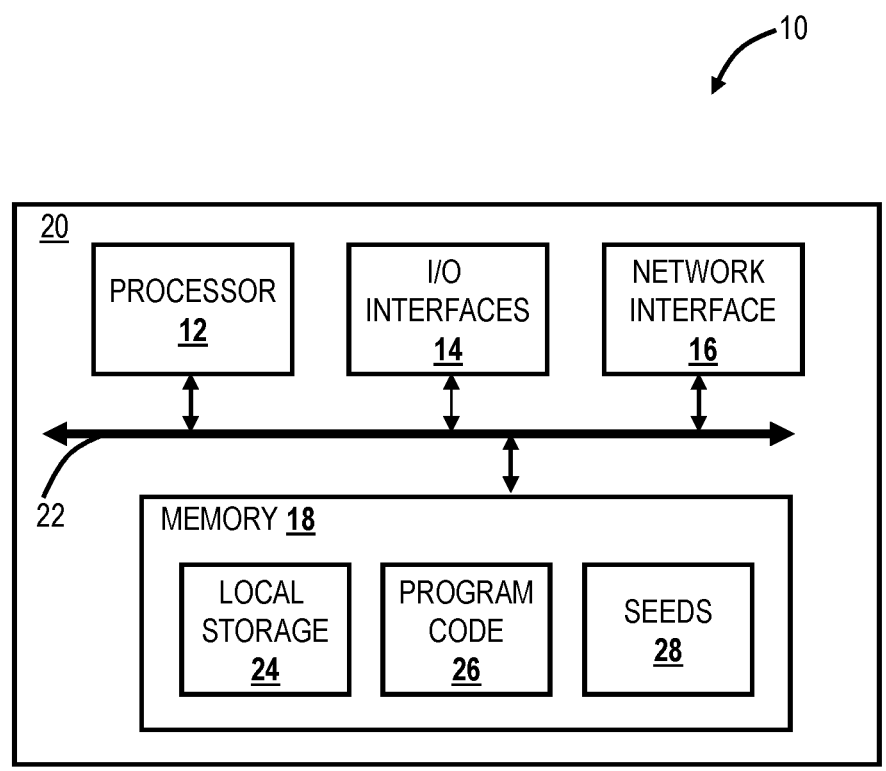
FIG. 1 is a block diagram of a constrained device.

FIG. 1 is a block diagram of a constrained device 10. The constrained device 10 may be a digital computing device that, in terms of hardware architecture, generally includes a processor 12, input/output (I/O) interfaces 14, a network interface 16, a data store 308, and memory 18, which can be contained in a housing 20. The components (12, 14, 16, 18) are communicatively coupled via a local interface 22. The local interface 22 may be, for example, but not limited to, one or more buses or other connections, as is known in the art. The local interface 22 may have additional elements, which are omitted for simplicity, such as controllers, buffers (caches), drivers, repeaters, and receivers, among many others, to enable communications. Further, the local interface 22 may include address, control, and/or data connections to enable appropriate communications. It should be appreciated by those skilled in the art that FIG. 1 depicts the constrained device 10 in an oversimplified manner, and a practical embodiment may include additional components and suitably configured processing logic to support known or conventional operating features that are not described in detail herein, such as, e.g., power, a battery, etc. Also, those skilled in the art will appreciate the components in FIG. 1 are a functional representation and practical embodiments may include integration of the functions in circuitry. Those skilled in the art will appreciate the constrained device 10 is presented as an example architecture for illustration purposes and other approaches are contemplated.

The processor 12 is a hardware device for executing software instructions. The processor 12 may be any custom made or commercially available processor, a Central Processing Unit (CPU), an auxiliary processor among several processors associated with the constrained device 10, a microcontroller, a semiconductor-based microprocessor (in the form of a microchip or chipset), or generally any device for executing software instructions. When the constrained device 10 is in operation, the constrained device 10 is configured to execute instructions stored within the memory 18, to communicate data to and from the memory 18, and to generally control operations of the constrained device 10 pursuant to the instructions. Again, a constrained device 10 is not a general-purpose computing device, but one focused on one or more specific functions. The processor 12 does not necessarily have to support general purpose operation, but can be configured to only support the one or more specific functions.

The I/O interfaces 14 may be used to receive input from and/or for providing output. In the constrained device 10, unlike a general-purpose computing device, does not usually have a touch screen, keyboard, mouse, etc., but rather I/O directed towards the one or more specific functions, such as visual indicators (e.g., Light Emitting Diodes (LEDs)), buttons, a display for displaying information related to the one or more specific functions, and the like. The network interface 16 is used to enable the constrained device 10 to communicate on a network, such as the Internet. The network interface 16 may include, for example, an Ethernet card or adapter or a Wireless Local Area Network (WLAN) card or adapter. The network interface 16 may include address, control, and/or data connections to enable appropriate communications on the network. For example, the network interface 16 can support Wi-Fi, Bluetooth, Bluetooth Low Energy (BLE), other types of wireless protocols, and combinations thereof.

The memory 18 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 18 may incorporate electronic, magnetic, optical, and/or other types of storage media. Note that the memory 18 may have a distributed architecture, where various components are situated remotely from one another but can be accessed by the processor 18. The memory 18 is configured to store data such as in local storage 24, program code 26, and seeds 28. Note, the local storage 24, the program code 26, and the seeds 28 can be stored in the same physical memory hardware and are described logically. The program code 26 include executable instructions for implementing logical functions to support the one or more specific functions. The program code 26 may include instructions configured to implement the various processes, algorithms, methods, techniques, etc. described herein. The local storage 24 can store data related to ongoing operation of the one or more specific functions. Finally, the seeds 28 represent constituent parts of a private key for the constrained device 10. The private key is associated with a quantum-safe algorithm. That is, the private key itself is not stored in the memory 18, but rather the seeds 28, and the program code 26 is configured to generate the private key as needed.

Example Constrained Devices and Private Key Applications

As described herein, the constrained device 10 can be an embedded device, an IoT device, a sensor, or the like. The private key is used to secure operations associated with the constrained device 10, such as for communications to cloud services and the like. The private key is used for device identity, device enrollment in services, secure booting, authentication, encryption in communications, provisioning, software updates, and the like. That is, the private key is utilized occasionally, but not ongoing at all times of operation of the constrained device 10. Accordingly, there is not a need to keep the private key stored in the memory 18 all the time, but only on demand as needed.

According to one example, the constrained device 10 may be within a kitchen appliance (e.g., refrigerator) for initially uploading registration information about the kitchen application (e.g., serial number, model number, purchaser information, etc.) when this product is first plugged in and connected online. Also, according to this example, the constrained device 10 may convey operating conditions of the kitchen appliance to the cloud-based server in order to allow the cloud-based server to monitor, for example, whether maintenance may be required on the host device. In this example, the kitchen appliance may include a large population of existing devices, having constraints in the memory 18, so that it is not possible to efficiently store a private key for the quantum-safe algorithms that is significantly larger than a private key for existing symmetric or asymmetric algorithms. That is, it may be possible to increase the size of the memory 18 in new kitchen appliances, but it is not possible to do so for a large population of existing devices.

According to another example, the constrained device 10 may include a tracker tag which is a small, battery-powered device configured to attach to devices for location determination. For example, the tracker tag can use BLE, ultra-wideband (UWB), etc. to respond to location requests. The tracker tags may be affixed to practically anything, e.g., backpacks, luggage, keys, etc. The tracker tags may use the private key to authenticate communications. For user output, the tracker tags may be configured to play a sound on demand as well as respond over a network to cloud services with a location, e.g., Global Position Satellite (GPS) coordinates, and the like. In this example, it may be possible to scale the memory 18 size in new tracker tags, but having larger memory 18 may result in higher power consumption which is undesirable. That is, reducing the memory 18 usage supports longer battery life.

Digital Trust with the Constrained Device

The private key on the constrained device 10 is used for various aspects of digital trust with the constrained device 10. The private key is preconfigured on the constrained device 10, such as in manufacturing, assembly, etc. Another service, such as a cloud service configured to communicate with the constrained device 10 has a corresponding public key which is used to encrypt any communications to the constrained device 10. The constrained device 10 uses the private key to decrypt the communications that were encrypted via the public key.

Conventional Encryption Algorithms

Again, the existing approaches use either asymmetric or symmetric algorithms, such as RSA, ECC, AES, etc. The private key lengths here range from 112 bits (RSA 2048) to 256 bits (ECC 521, AES 256). These existing approaches use hard mathematical problems, such as the integer factorization problem, the discrete logarithm problem or the elliptic-curve discrete logarithm problem. Using existing computers, these hard mathematical problems are extremely difficult to attack. However, newly emerging quantum computers will be able to break these existing algorithms. To that end, there is ongoing work and standardization of so-called quantum-safe algorithms.

Quantum-Safe Algorithms

The present disclosure utilizes the term quantum-safe algorithms to refer to algorithms which are secure to attacks by a quantum computer. Other terms include post-quantum cryptography (PQC), quantum-resistant, etc. Again, the problem with quantum computers and the existing approaches above is they rely on the hard mathematical problems which are easily solved on a sufficiently powerful quantum computer.

To that end, quantum-safe algorithms focus on different approaches which are summarized as follows. Of note, all of these quantum-safe algorithms have private keys which are significantly larger in size than the private keys size in the existing approaches which at most are a couple hundred bits. With quantum-safe algorithms, the private key sizes can range close to a kilobyte to several kilobytes or more. Thus, the memory 18 requirements can be one or more orders of magnitude greater to store the private key for quantum-safe algorithms than for existing algorithms.

Quantum-safe algorithms can be lattice-based, hash-based, code-based, multivariate-based, isogeny-based, and the like. The present disclosure contemplates any of these quantum-safe algorithms. Note, in all of these quantum-safe algorithms, the private key is generated based on some operations on seeds. That is, the private key can be a product of some operations involving seeds. As described herein, seeds are underlying numbers used to generate the private key.

Process

Figure 2:
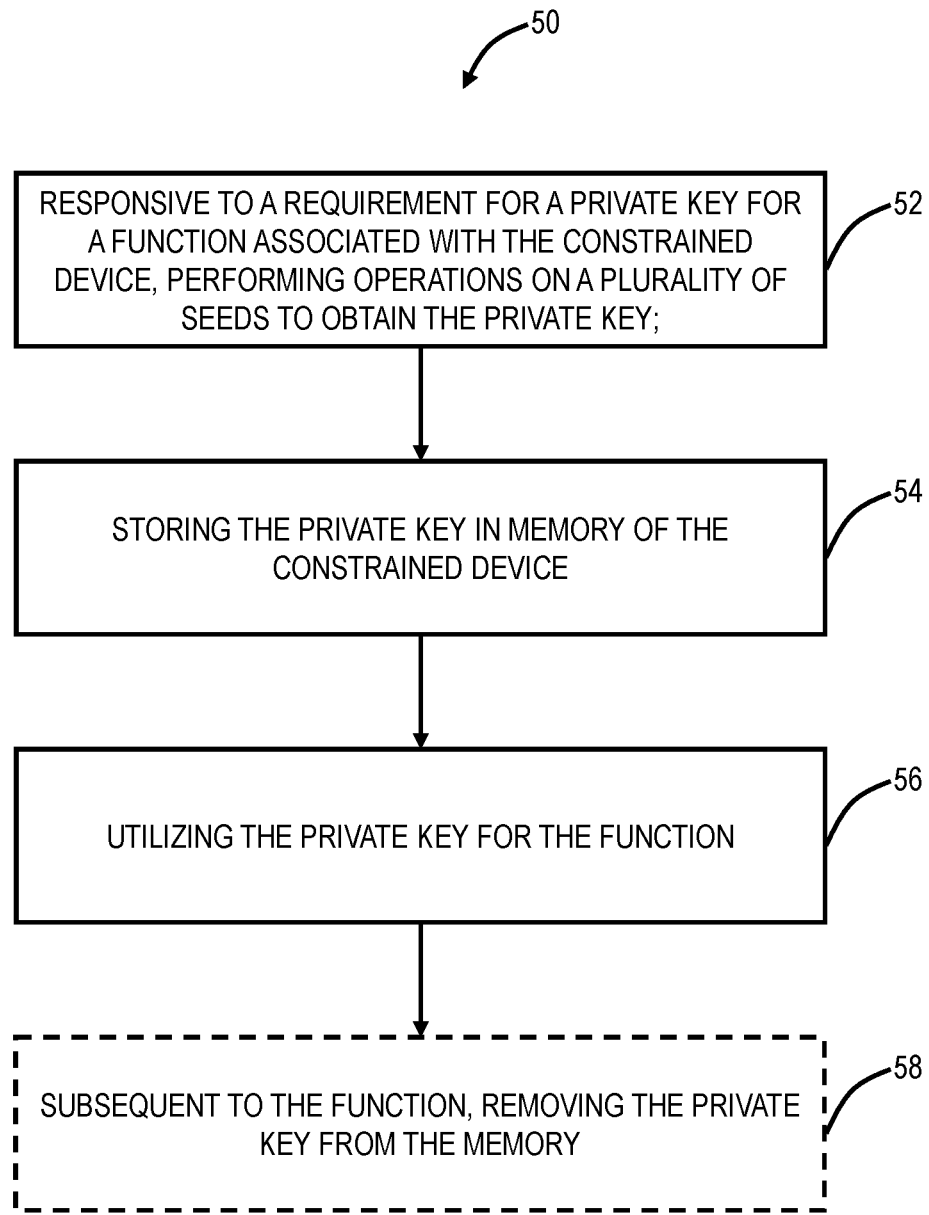
FIG. 2 is a process for generating private keys for quantum-safe algorithms on constrained devices.

FIG. 2 is a process 50 for generating private keys for quantum-safe algorithms on constrained devices. The process 50 contemplates implementation as a method having steps, via the constrained device 10 configured to implement the steps, and via a non-transitory computer-readable medium storing instructions that, when executed, cause a processor to implement the steps.

The process 50 includes, responsive to a requirement for a private key for a function associated with the constrained device, performing operations on a plurality of seeds to obtain the private key (step 52); storing the private key in memory of the constrained device (step 54); and utilizing the private key for the function (step 56). The process 50 can include, subsequent to the function, removing the private key from the memory (step 58).

The private key is for a quantum-safe algorithm. Advantageously, the process 50 enables support for the quantum-safe algorithm, considering resource constraints in the constrained device, namely fixed memory, processing capabilities, etc. The quantum-safe algorithm can be one of lattice-based, hash-based, code-based, multivariate-based, and isogeny-based. Of note, the process 50 can work with any algorithm that includes some mathematical generation of the private key based on seeds.

The process 50 can include, prior to the requirement for the private key, storing the plurality of seeds in the memory. For example, this can be performed at manufacturing, assembly, etc. It can also be performed in an upgrade, update, etc.

The memory can store the plurality of seeds and logic that defines the operations on the plurality of seeds to obtain the private key. Of note, this differs from the conventional approach where the memory simply stores the private key itself. As noted herein, the private keys for quantum-safe algorithms can take several kilobytes. Assume, e.g., the constrained device has tens or a hundred kilobytes of memory. Storing only the seeds and the logic to create the private key from the seeds can save a significant amount of the memory.

In an embodiment, the constrained device utilizes a non-quantum safe algorithm with an existing private key stored in memory, and, for upgrading the constrained device from using the non-quantum safe algorithm to a quantum-safe algorithm, the process 50 includes deleting the existing private key stored in the memory; and receiving and storing the plurality of seeds and associated program code for the operations on the plurality of seeds to obtain the private key. Of note, one use of the process 50 is to upgrade existing constrained devices to support these more complex quantum-safe algorithms.

The function can relate to one of authentication, encrypted communication, enrollment, provisioning, and upgrades. The constrained device can be an Internet-of-Things (IoT) device. The constrained device can be a battery-powered tracker tag.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A constrained device comprising:
a processor; and
memory storing program code that is configured to cause the processor to:
responsive to a requirement for a private key for a function, perform operations on a plurality of seeds to obtain the private key;
store the private key in the memory; and
utilize the private key for the function,
wherein the program code is further configured to, for upgrading the constrained device from using non-quantum safe algorithm to a quantum safe algorithm, cause the processor to:
delete an existing private key stored in the memory, wherein the existing private key is for a non-quantum safe algorithm; and
receive and store the plurality of seeds and associated program code for the operations on the plurality of seeds to obtain the private key.

2. The constrained device of claim 1, wherein the program code is further configured to cause the processor to:
subsequent to the function, remove the private key from the memory.

3. The constrained device of claim 1, wherein the private key is for a quantum-safe algorithm.

4. The constrained device of claim 3, wherein the quantum-safe algorithm is one of lattice-based, hash-based, code-based, multivariate-based, and isogeny-based.

5. The constrained device of claim 1, wherein the program code is further configured to cause the processor to:
prior to the requirement for the private key, store the plurality of seeds in the memory.

6. The constrained device of claim 1, wherein the memory further stores the plurality of seeds and logic that defines the operations on the plurality of seeds to obtain the private key.

7. The constrained device of claim 1, wherein the function relates to one of authentication, encrypted communication, enrollment, provisioning, and upgrades.

8. The constrained device of claim 1, wherein the constrained device is an Internet-of-Things (IoT) device.

9. The constrained device of claim 1, wherein the constrained device is a battery-powered tracker tag.

10. A method implemented by a constrained device, the method comprising steps of:
responsive to a requirement for a private key for a function associated with the constrained device, performing operations on a plurality of seeds to obtain the private key;
storing the private key in memory of the constrained device; and
utilizing the private key for the function,
wherein the constrained device utilizes a non-quantum safe algorithm with an existing private key stored in memory, and, for upgrading the constrained device from using the non-quantum safe algorithm to a quantum safe algorithm, the steps further include:
deleting the existing private key stored in the memory; and
receiving and storing the plurality of seeds and associated program code for the operations on the plurality of seeds to obtain the private key.

11. The method of claim 10, wherein the steps further include:
subsequent to the function, removing the private key from the memory.

12. The method of claim 10, wherein the private key is for a quantum-safe algorithm.

13. The method of claim 12, wherein the quantum-safe algorithm is one of lattice-based, hash-based, code-based, multivariate-based, and isogeny-based.

14. The method of claim 10, wherein the steps further include:
    prior to the requirement for the private key, storing the plurality of seeds in the memory.

15. The method of claim 10, wherein the memory stores the plurality of seeds and logic that defines the operations on the plurality of seeds to obtain the private key.

16. The method of claim 10, wherein the function relates to one of authentication, encrypted communication, enrollment, provisioning, and upgrades.

17. The method of claim 10, wherein the constrained device is an Internet-of-Things (IoT) device.

18. The method of claim 10, wherein the constrained device is a battery-powered tracker tag.

\* \* \* \* \*